US008808595B2

(12) United States Patent
Babrowicz et al.

(10) Patent No.: US 8,808,595 B2
(45) Date of Patent: Aug. 19, 2014

(54) MULTILAYER FILM FOR MEDICAL SOLUTION POUCHES HAVING REDUCED PROFICIENCY FOR FORMING BUBBLES

(75) Inventors: Robert Babrowicz, Spartanburg, SC (US); Marvin Russell Havens, Greer, SC (US); Jerry Christopher Richardson, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 729 days.

(21) Appl. No.: 12/419,601

(22) Filed: Apr. 7, 2009

(65) Prior Publication Data

US 2010/0256590 A1     Oct. 7, 2010

(51) Int. Cl.
*B32B 27/06* (2006.01)
*B32B 27/18* (2006.01)
*B29C 47/06* (2006.01)
*B32B 33/00* (2006.01)

(52) U.S. Cl.
USPC ............ 264/173.14; 264/173.11; 264/173.15; 264/173.16; 264/173.19; 264/209.3; 264/211; 264/515

(58) Field of Classification Search
None
See application file for complete search history.

(56) References Cited

U.S. PATENT DOCUMENTS

| | | |
|---|---|---|
| 3,645,992 A | 2/1972 | Elston |
| 4,188,443 A | 2/1980 | Mueller et al. |
| 4,274,900 A | 6/1981 | Mueller et al. |
| 4,352,849 A | 10/1982 | Mueller |
| 4,359,495 A | 11/1982 | Schroeder et al. |
| 4,391,862 A | 7/1983 | Bornstein et al. |
| 4,407,874 A | 10/1983 | Gehrke |
| 4,528,220 A | 7/1985 | Hwo |
| 4,643,926 A | 2/1987 | Mueller |
| 4,726,997 A | 2/1988 | Mueller et al. |
| 4,803,102 A | 2/1989 | Raniere et al. |
| 4,816,343 A | 3/1989 | Mueller et al. |
| 4,837,115 A * | 6/1989 | Igarashi et al. ............ 428/36.92 |
| 4,885,119 A | 12/1989 | Mueller et al. |
| 4,891,253 A | 1/1990 | Mueller |
| 4,966,795 A | 10/1990 | Genske et al. |
| 4,996,848 A * | 3/1991 | Nelson et al. ..................... 62/77 |

(Continued)

FOREIGN PATENT DOCUMENTS

| | | |
|---|---|---|
| EP | 0 506 348 | 3/1992 |
| EP | 0 597 502 | 5/1994 |

(Continued)

OTHER PUBLICATIONS

International Search Report and Written Opinion for International Application No. PCT/US10/29533 mailed May 12, 2010.

*Primary Examiner* — Jeffrey Wollschlager
(74) *Attorney, Agent, or Firm* — Alston & Bird LLP

(57) ABSTRACT

The present invention provides a multilayer film for forming medical solution pouches that help prevent or reduce the presence of bubbles or foam in the solution after heat sterilization. In particular, the present invention provides a multilayer film for forming medical solution pouches that are capable of passing the bubble test as set forth in the Chinese State Drug Package Container Material Standard No. YBB00112005. In particular, the present invention provides a multilayer film in which polyamide 612 or calcium stearate component has been incorporated as an anti-foaming agent. The presence of polyamide 612 or calcium stearate in one or more layers of the film helps prevent the formation of foam in the solution after heat sterilization.

9 Claims, 2 Drawing Sheets

(56) References Cited

U.S. PATENT DOCUMENTS

Figure 1:
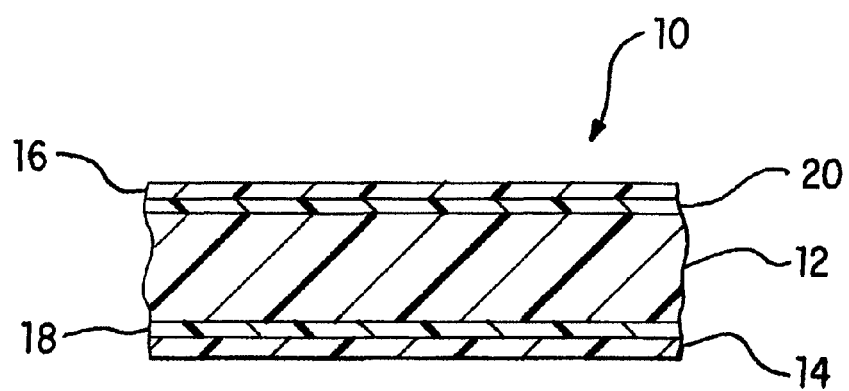

| | | | |
|---|---|---|---|
| 5,108,844 A * | 4/1992 | Blemberg et al. | 428/518 |
| 5,139,831 A * | 8/1992 | Mueller | 428/34.3 |
| 5,206,075 A | 4/1993 | Hodgson, Jr. | |
| 5,241,031 A | 8/1993 | Mehta | |
| 5,272,236 A | 12/1993 | Lai et al. | |
| 5,278,272 A | 1/1994 | Lai et al. | |
| 5,324,555 A | 6/1994 | Hughart et al. | |
| 5,491,019 A | 2/1996 | Kuo | |
| 5,604,043 A | 2/1997 | Ahlgren | |
| 5,681,627 A | 10/1997 | Mueller | |
| 5,688,456 A * | 11/1997 | Kuriu et al. | 264/173.14 |
| 5,695,840 A | 12/1997 | Mueller | |
| 6,027,776 A * | 2/2000 | Mueller | 428/35.2 |
| 6,699,549 B1 * | 3/2004 | Ueyama et al. | 428/36.7 |
| 7,022,390 B2 | 4/2006 | Odorisio et al. | |
| 2003/0011381 A1 * | 1/2003 | Arndt | 324/537 |
| 2004/0121054 A1 * | 6/2004 | Berrier et al. | 426/412 |
| 2004/0151934 A1 | 8/2004 | Schwark et al. | |
| 2005/0142314 A1 | 6/2005 | Burgmeier et al. | |
| 2005/0255196 A1 * | 11/2005 | Opuszko et al. | 426/106 |
| 2006/0019112 A1 * | 1/2006 | Holmes et al. | 428/500 |
| 2007/0110997 A1 * | 5/2007 | Aguirre | 428/349 |
| 2008/0182053 A1 * | 7/2008 | Broadus et al. | 428/34.9 |
| 2012/0087968 A1 * | 4/2012 | Ebner | 424/412 |

FOREIGN PATENT DOCUMENTS

| | | |
|---|---|---|
| EP | 0 600 425 | 6/1994 |
| EP | 0 641 647 | 3/1995 |
| WO | WO 90/03414 | 4/1990 |
| WO | WO 93/03093 | 2/1993 |

* cited by examiner

MULTILAYER FILM FOR MEDICAL SOLUTION POUCHES HAVING REDUCED PROFICIENCY FOR FORMING BUBBLES

BACKGROUND OF THE INVENTION

It is common practice to supply medical solutions for parenteral administration in the form of disposable, flexible pouches. One class of such pouches is commonly referred to as an "I.V. bag." These pouches must meet a number of performance criteria, including collapsibility, optical clarity and transparency, high-temperature heat-resistance, and sufficient mechanical strength to withstand the rigors of the environment in which they are used. Medical solution pouches should also provide a sufficient barrier to the passage of moisture vapor and other gasses to prevent contamination of the solution contained therein.

High-temperature heat resistance of medical pouches is important so that the contents of the pouch can be heat sterilized. Heat-sterilization of solution-containing medical pouches typically occurs in an autoclave at about 250° F. for periods of 15 to 30 minutes. Steam is generally used as the heat-transfer medium. Heat-sterilization is normally performed by the manufacturer and/or packager of the medical solution prior to sending the packaged medical solution to the end user, e.g., a hospital. This helps to ensure that the medical solution, as packaged in the medical solution pouch, will be substantially free from contamination. Accordingly, a requirement of medical solution pouches is that they must be able to endure the high temperatures which are encountered during heat-sterilization without deterioration by, e.g., developing a heat-seal leak or other type of containment failure.

To achieve the desired properties and functionalities, films for use in medical pouch applications generally include multiple layers in which each layer provides one or more properties so that the resulting pouch has the desired end properties. For example, the film may include outer layers and one or more inner layers including adhesive or "tie" layers that adhere layers to each other. Generally, films for use in the preparation of medical pouches include a heat/abuse-resistant layer that forms the outside surface of the pouch. The primary functions of the outer layer are to provide heat-resistance to the pouch during heat-sealing and heat-sterilization, and to provide abuse-resistance from external handling and abrasion.

During autoclaving, the film is subjected to a high temperature to sterilize the contents of the pouch. In the case of medical solutions, the autoclaving process can result in the formation of bubbles or foam within the solution. It is believed that the formation of bubbles or foam may be the result of components of the film that have migrated into the medical solution during autoclaving. The presence of such foam/bubbles may in some cases be undesirable. For instance, films for use in medical pouches in China must pass a so-called "bubble test" in which the presence of any bubbles or foam after autoclaving and rigorous shaking must quickly dissipate.

Accordingly, there exists a need for a multilayer film that is suitable for as a material for the manufacture of medical solution pouches, and which has a reduced proficiency for forming foam or bubbles after the pouch has been heat-sterilized.

BRIEF SUMMARY OF THE INVENTION

The present invention is directed to a multilayer film for forming medical solution pouches that helps prevent or reduce the presence of bubbles or foam in the solution after heat sterilization, such as autoclaving. In particular, the present invention provides a multilayer film for forming medical solution pouches that are capable of passing the bubble test as set forth in the Chinese State Drug Package Container Material Standard No. YBB00112005.

The inventors of the present invention have discovered that incorporating polyamide 612, calcium stearate, or a combination thereof into one or more layers of the film can help prevent or reduce the formation of foam in the medical solution following autoclaving. Polymeric films may include additives and other components that can migrate through the film during heat sterilization. Such components can also include residuals that comprise unreacted or partially reacted monomers, dimers, and trimers. The inventors have discovered that the presence of polyamide 612 or calcium stearate, or a combination thereof in one or more layers of the film can help prevent residuals and other components of the film from migrating through the film and into the contents of the pouch. As a result, the formation of foam in the solution after heat sterilization can be reduced or prevented.

The amount of polyamide 612 added as an anti-foaming agent generally ranges from about 10 to 35 weight percent, based on the total weight of the layer to which it has been added. In one particular embodiment, the amount of polyamide 612 is from about 20 to 35 weight percent, based on the total weight of the layer to which it has been added. The amount of calcium stearate added as an antifoaming agent typically ranges from about 1 to 2 weight percent, based on the total weight of the layer to which it has been added.

In addition to polyamide 612 and calcium stearate, the inventors have also discovered that certain fatty amides can also help reduce or prevent the formation of foam. Fatty amides and derivatives thereof that can be used in the practice of the invention generally have carbon chains that are between about 12 to 22 carbons. In particular, it is generally desirable for the fatty amide to have a melting point above about 100° C., and more particularly above about 121° C. In one embodiment, the fatty amides and derivatives thereof are selected from the group consisting of N,N'-ethylene bis (stearamide), N,N'-methylene bis(stearamide), N,N'-ethylene bis(oleamide), N,N'-propylene bis(oleamide), N,N' ethylene-bis(12-hydroxysteramide), and N(2-hydroxethyl) 12-hydroxysteramide, and blends thereof. The amount of the fatty amide component that is incorporated into the film layer may be from about 1 to 2 weight percent.

In one embodiment, the present invention is directed to a multilayer film wherein at least one of the exterior layers of the film comprises a copolyester having a dicarboxylic acid component and a diol component. In this embodiment, the polyamide 612 or calcium stearate is preferably incorporated in the copolyester layer. The copolyester layer can be used to form the outer surface layer of a pouch formed from the multilayer film.

The multilayer film may include five layers and have an interior core layer, a first exterior layer defining an inner surface of a pouch formed therefrom, a second exterior layer forming an outer surface of a pouch formed therefrom, a first adhesive layer positioned between and in adherence with interior layer and first exterior layer, and a second adhesive layer positioned between and in adherence with interior layer and second exterior layer. As noted above, the second exterior layer preferably comprises a copolyester in which the polyamide 612 or calcium stearate is incorporated.

In a further aspect, the present invention provides medical pouches formed from a multilayer film having a reduced proficiency for forming bubbles or foam following heat sterilization. In one embodiment, the layer of the film forming an outer surface of the pouch is comprised of a copolyester in which the polyamide 612 or calcium stearate is incorporated.

In addition to reducing or preventing the formation of foam or bubbles, the multilayer films of the present invention exhibit all of the other performance criteria which are required in a medical solution pouch. That is, the multilayer films have good optical properties, flexibility/collapsibility and mechanical strength, and are able to withstand high-temperature sterilization. In addition, the films provide good barrier properties. For these reasons, the inventive multilayer films are ideally suited for the packaging and administration of medical solutions.

BRIEF DESCRIPTION OF THE SEVERAL VIEWS OF THE DRAWING(S)

Figure 2:
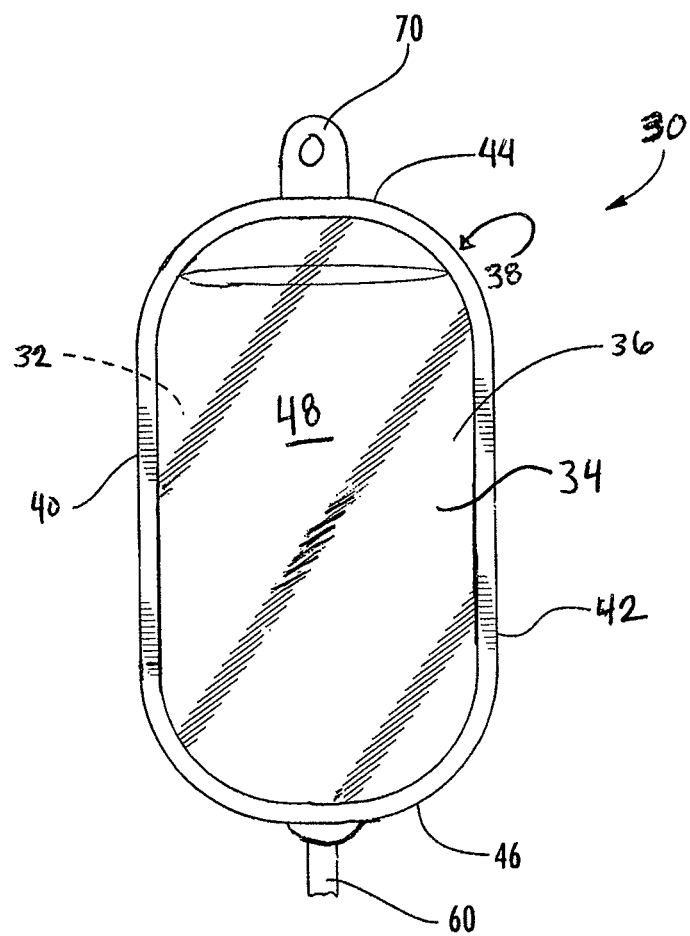

Having thus described the invention in general terms, reference will now be made to the accompanying drawings, which are not necessarily drawn to scale, and wherein:

FIG. 1 is a schematic cross-section of a five-layer film in accordance with the present invention; and FIG. 2 is a perspective view of a pouch prepared from a multilayer film that is in accordance with the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is directed to a multilayer film that can be used for forming flexible pouches that can be used to package and administer medical solutions, and more specifically, to pouches having a reduced proficiency for forming foam in a medical solution following heat sterilization. The inventors of the present invention have discovered that incorporating polyamide 612 or calcium stearate into one or more layers of the film as an anti-foaming agent can help prevent or reduce the formation of foam in the medical solution following autoclaving. In the context of the invention, the term foam is used interchangeably with the term "bubble" or "bubbles."

In particular, films in accordance with the present invention are capable of passing the so-called "bubble test" in accordance with the test methods required by the Chinese State Food and Drug Administration (SFDA). The bubble test is described in the State Drug Package Container Material Standard No. YBB00112005, the contents of which are hereby incorporated by reference. According to the test, an inner surface area of 600 cm$^2$ at a smooth part of film is cut it into 5 cm×0.5 cm slices. The slices are then washed with water and dried at room temperature. The slices are put into 500 ml taper bottle (e.g., Erlenmeyer flask) in which 200 ml water is added. The bottle is then sealed and put into high-pressure steam sterilizer for 30 minutes at a temperature of 121° C. Following heat-sterilization, the bottle is cooled to room temperature and the resulting solution is used as the test solution. 5 ml of the test solution is placed into a test tube with a stopper (the test tube has an inner diameter of 15 mm and height of 200 mm). The test tube and test solution are then fiercely shaken for 3 minutes. Any bubbles generated should disappear in 3 minutes.

Examples of medical solutions which can be packaged and administered in accordance with the present invention include saline solutions, dextrose solutions, and solutions for dialysis applications. In the context of the invention, the term pouch also includes bags, satchels, and the like.

With reference to FIG. 1, a multilayer film that is in accordance with one embodiment of the invention is illustrated and broadly designated by reference number 10. In the illustrated embodiment, the film 10 is depicted as having 5 layers. However, it should be understood that the film can include less or more layers including 3, 4, 6, 7 or more layers. As shown, multilayer film 10 may include an interior core layer 12, a first exterior layer 14, a second exterior layer 16, a first adhesive layer 18 positioned between and in adherence with interior layer 12 and first exterior layer 14, and a second adhesive layer 20 positioned between and in adherence with interior layer 12 and second exterior layer 16.

In general, polymeric films may include additives and other components that can migrate through the film during heat sterilization. Such components can also include residuals that comprise unreacted or partially reacted monomers, dimers, and trimers. While not wishing to be bound by theory, it is believed that these components migrate into solutions in the pouch and promote the formation of foam therein. To help prevent the formation of such foam, the inventors have discovered that the presence of polyamide 612, calcium stearate, or a combination thereof in one or more layers of the film can help prevent residuals and other components of the film from migrating into the film. As a result, the formation of foam in the solution after heat sterilization can be reduced or prevented. In particular, the presence of the polyamide 612 and/or calcium stearate in the second exterior layer of the film can help reduce the formation of foam so that the medical pouches prepared therefrom are capable of passing the bubble test as set forth in the State Drug Package Container Material Standard No. YBB00112005.

In addition to reducing or preventing the formation of foam, the use of polyamide 612 and/or calcium stearate also does not result in blooming of the anti-foaming additive during sterilization, such as autoclaving. Blooming refers to the tendency of the material to migrate to the exterior surface of the film during the autoclaving process. Blooming is typically associated with the bag having a hazy appearance and the presence of a waxy residual on the outer surface of the bag/film.

When multilayer film 10 is formed into a medical solution pouch, second exterior layer 16 forms the outside surface of the pouch. As such, the primary functions of exterior layer 16 are to provide heat-resistance to the pouch during heat-sealing and heat-sterilization, and to provide abuse-resistance from external handling and abrasion. Copolyesters owing to their high abuse and heat resistant properties are particularly suited for use in the second exterior layer of the film, and in particular, in films that are used in the production of medical pouches. One such copolyester is produced from a condensation reaction of a dicarboxylic acid component and two diol components, and is available from Eastman Chemical Products, Inc. under the tradenames Ecdel™ 9965, 9966, and 9967. For example, copolyesters available under the tradename Ecdel are produced from two diols (e.g., 1,4 cyclohexanedimethanol and a hydroxyl terminated polyether) and a dicarboxylic acid component (e.g., 1,4-cyclohexanedicarboxylic acid).

In a preferred embodiment, the second exterior layer 16 comprises a copolyester and a polyamide 612 (also commonly known as PA 612 or nylon 612), wherein the copolyester has a dicarboxylic acid component and a diol component. The condensation polymerization of copolyester can sometimes be characterized as being rather "messy," meaning that the resulting polymer layer may include residuals that are present in the polymer. As noted above, such residuals may include unreacted or partially reacted polymer monomers, such as dimers and trimers, which can migrate into the medical solution during autoclaving and contribute to the formation of foam in the solution. Thus, the presence of the polyamide 612 helps prevent or reduce such components from migrating from the second exterior layer into the solution.

Polyamide 612 is the polycondensation product of 1,6-hexamethylene diamine and 1,12-dodecanedioic acid (1,10-decane dicarboxylic acid). The amount of polyamide 612 that is incorporated into the copolyester layer is generally between about 5 to 40 weight percent based on the total weight of the layer into which the polyamide 612 has been incorporated. In particular, the copolyester layer may include from 10 to 35 weight percent polyamide 612 and more particularly, from about 20 to 30 weight percent polyamide 612.

The amount of calcium stearate that is added as an antifoaming agent generally ranges from about 0.5 weight percent or greater and in particular from about 1 to 2 weight percent, based on the total weight of the layer to which the calcium stearate has been added.

Generally, the polyamide 612 and calcium stearate can be blended as an additive during the extrusion process. In other embodiments, the polyamide 612 and calcium stearate can be incorporated into other layers of the film, such as an interior layer or the first exterior layer.

In some embodiments, exterior layer 16 may also comprise materials selected from the group consisting of other polyamides, copolyamide, polyester, high density polyethylene, polypropylene, propylene/ethylene copolymer, and polycarbonate.

As shown in FIG. 1, the interior layer 12 may be relatively thick in comparison to the other layers of film 10. Such relative thickness generally facilitates layer 12 in carrying out its primary functions of imparting flexibility, strength, and barrier properties to multilayer film 10. A layer which provides such functions is often referred to as a "core" layer.

Being the thickest layer in multilayer film 10, interior layer 12 generally has the greatest impact on the optical properties of a medical solution pouch made from film 10 after that pouch has been heat-sterilized. Thus, the unexpected discovery that a homogeneous ethylene/alpha-olefin copolymer traps less steam condensate after heat-sterilization than a heterogeneous ethylene/alpha-olefin is particularly significant. This property alone, however, is not enough to qualify a material as suitable for use as a core layer in a multilayer film used to make medical solution pouches. The material should also 1) have a sufficiently high melting point that the film remains intact during the heat-sterilization process; 2) provide adequate barrier properties, especially to oxygen and water vapor; 3) be processable (e.g., coextrudable) with the other layers of the film; and 4) impart sufficient flexibility to the film that a medical solution pouch made therefrom can drain properly. The inventor has determined that if the homogeneous ethylene/alpha-olefin copolymer, or blend of ethylene/alpha-olefin copolymers, of layer 12 has a density ranging from about 0.89 to about 0.92 grams per cubic centimeter, the copolymer is capable of providing each of the foregoing properties (in addition to excellent optical properties due to a lessened tendency to trap steam condensate). Specifically, while homogeneous ethylene/alpha-olefin copolymers, or blends thereof, with densities below about 0.89 g/cc may be operable, such copolymers are not likely to have a combination of sufficient heat-resistance to withstand heat-sterilization, adequate gas impermeability, and satisfactory melt strength to be coextrudable with the other layers of the film. Similarly, if the density of the homogeneous ethylene/alpha-olefin copolymer, or blend of copolymers, is greater than about 0.92 g/cc, the resultant medical solution pouch may be too stiff to drain properly and may not provide the excellent optical properties after heat-sterilization which have otherwise been found to exist with homogeneous ethylene/alpha-olefins. A more preferred density range for the homogeneous ethylene/alpha-olefin copolymer or blend of copolymers is 0.90 to about 0.91 g/cc.

Generally, the melt-flow index (ASTM D-1238) of the homogeneous ethylene/alpha-olefin copolymer or blend of copolymers is less than 20, more preferably less than 10, even more preferably less than 2.2 and most preferably, between 0.1 and 1.5. Exemplary homogeneous ethylene/alpha-olefin copolymers include the following from the ExxonMobil Chemical Company: EXACT™ 3029 with a melt index of approximately 1.2 dg/min (ASTM D-1238), a density of approximately 0.91 g/cc (ASTM D-792), and a DSC peak melting point of approximately 107° C. (Exxon method); EXACT™ 3025 with a melt index of approximately 1.2 dg/min (ASTM D-1238), a density of approximately 0.91 g/cc (ASTM D-792), and a DSC peak melting point of approximately 103° C. (Exxon method); EXACT™ 3028 with a melt index of approximately 1.2 dg/min (ASTM D-1238), a density of approximately 0.90 g/cc (ASTM D-792), and a DSC peak melting point of approximately 92° C. (Exxon method); and EXACT™ 4011 with a melt index of approximately 2.2 dg/min (ASTM D-1238), a density of approximately 0.89 g/cc (ASTM D-1505), and a DSC peak melting point of approximately 70° C. (Exxon method). Other suitable homogeneous ethylene/alpha-olefin copolymers include AFFINITY resins from the Dow Chemical Co., such as PL 1880 with a density of approximately 0.90 g/cc and melt index of approximately 1.0 dg/min (ASTM D-1238); PL 1840 with a density of approximately 0.91 g/cc and melt index of approximately 1.0 dg/min (ASTM D-1238); PL 1845 with a density of approximately 0.91 g/cc and melt index of approximately 3.5 dg/min (ASTM D-1238); and FM 1570 with a density of approximately 0.915 g/cc and melt index of approximately 1.0 dg/min (ASTM D-1238).

In the formation of medical pouches, the first exterior layer 14 serves as a heat-seal layer. In this manner, when multilayer film 10 is formed into a medical solution pouch, first exterior layer 14 will form the inside surface of the pouch, i.e., the surface which is in contact with the packaged medical solution. In addition, layer 14 forms a heat-seal when the film 10 is folded upon itself or mated with another film such that two regions of layer 14 are brought into contact with one another and sufficient heat is applied to predetermined segments of the contacting regions of layer 14 that the heated segments become molten and intermix with one another. Upon cooling, the heated segments of layer 14 become a single, essentially inseparable layer. In this manner, the heated segments of layer 14 produce a liquid-tight closure which is commonly referred to as a heat-seal. The heat-seals thus formed are generally fin-shaped and are linked together to define the peripheral boundaries of the pouch so that a medical solution can be fully enclosed therein.

First exterior layer 14 comprises a material selected from the group consisting of a homopolymer or copolymer of polypropylene, a blend of homopolymer or copolymer of polypropylene and elastomer, high density polyethylene, and copolyester. Of the foregoing materials, layer 14 preferably comprises a blend of homopolymer or copolymer of polypropylene and elastomer. The polypropylene imparts good heat-resistance to layer 14 while the elastomer provides creep- and impact-resistance thereto. When the elastomer is blended with polypropylene such that the weight percentage of elastomer ranges from about 5 to about 50 (based on the total weight of layer 14), excellent heat-seals can be produced. The best heat-seals are obtained when the elastomer is present at a weight percentage ranging from about 10 to 40 and, most preferably, from about 10 to 30. Such heat-seals are consistently able to withstand all of the severe conditions typically encountered by medical solution pouches, i.e., heat-sterilization, pressure-cuff application, and general rough handling.

The homopolymer or copolymer of polypropylene is preferably propylene/ethylene copolymer having from about 2 to about 10 percent by weight ethylene and, more preferably, from about 4 to about 6 percent ethylene. A suitable propylene/ethylene copolymer is commercially available from the Total Petrochemicals under the tradename Z9450, and has an ethylene content of about 6 weight percent. Other commercially available propylene/ethylene copolymers include, e.g., PLTD 665 from ExxonMobil. The polypropylene used in layer 14 may be of any of the available types, i.e., isotactic, syndiotactic, and, less preferably, atactic.

The elastomer may be selected from the group consisting of styrene-ethylene-butylene-styrene block copolymer (SEBS), styrene-butadiene-styrene block copolymer (SBS), styrene-isoprene-styrene block copolymer (SIS), ethylene-propylene rubber (EPM), and ethylene-propylene-diene terpolymer (EPDM). SEBS is commercially available, e.g., Kraton Polymers Co. G-1650, G-1652, and G-1657X. SBS is commercially available, e.g., Kraton Polymers Co. D-1101, D-1102, D-1300C, D-4122, D-4141, D-4455X, and D-4460X. SIS is commercially available, e.g., from Kraton Polymers Co. D-1107, D-1111, D-1112, and D-1117. EPM is commercially available, e.g., from Exxon Mobil as Vistalon 719 or 503. EPDM is commercially available, e.g., from Exxon Mobil as Vistalon 3708.

Suitable, pre-prepared blends of polypropylene and elastomer are also commercially available. For example, Z-4650 from Horizon Polymers is a blend of 80 percent by weight Z9450 (propylene/ethylene copolymer as described above) and 20 percent by weight Kraton G-1652 (SEBS as described above). The other materials from which layer 14 can be formed are all widely and commercially available.

First adhesive layer 18 preferably comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which first exterior layer 14 is formed, anhydride-modified ethylene/vinyl acetate copolymer, and anhydride-modified ethylene/methyl acrylate copolymer.

Each of the foregoing materials is compatible with the material from which interior layer 12 is formed (i.e., homogeneous ethylene/alpha-olefin copolymer). Thus, the particular material which is selected for adhesive layer 18 will depend upon the composition of first exterior layer 14. For example, when layer 14 comprises a blend of homopolymer or copolymer of polypropylene (e.g., propylene/ethylene copolymer) and elastomer (e.g., SEBS), first adhesive layer 18 preferably comprises ethylene/alpha-olefin copolymer having a density of less than or equal to 0.89 grams per cubic centimeter. In one particular embodiment, the density is less than or equal to 0.88 g/cc. Such a material has been found to adhere very well to layers 12 and 14 and, as a result, is believed to provide improved pressure-cuff performance for medical solution pouches made from such films.

The most widely available ethylene/alpha-olefin copolymers with densities of 0.89 g/cc or less are those which are homogeneous, e.g., metallocene-catalyzed. Such copolymers are commercially available from resin manufacturers such as The Dow Chemical Company and the ExxonMobil Company. Exemplary ethylene/alpha-olefin copolymers with densities of 0.89 g/cc or less include ENGAGE™ EG 8150, an ethylene/octene copolymer commercially available from Dow and having a density of 0.868 g/cc (ASTM D-792), a melt index of 0.5 dg/min. (ASTM D-1238), and 25% octene (ASTM D-2238, Method B); ENGAGE™ EG 8100, an ethylene/octene copolymer having a density of 0.87 g/cc (ASTM D-792), a melt index of 1 dg/min. (ASTM D-1238), and 24% octene (ASTM D-2238, Method B); and ENGAGE™ EG 8200, an ethylene/octene copolymer having a density of 0.87 g/cc (ASTM D-792), a melt index of 5 dg/min. (ASTM D-1238), and 24% octene (ASTM D-2238, Method B).

Second adhesive layer 20 preferably comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

Each of the foregoing materials is compatible with interior layer 12. Thus, the particular choice of material for adhesive layer 20 will depend upon the material selected for second exterior layer 16. For example, when layer 16 comprises copolyester, adhesive layer 20 preferably comprises anhydride-modified ethylene/methyl acrylate copolymer. Suitable anhydride-modified ethylene/methyl acrylate copolymers are commercially available from DuPont under the tradenames BYNEL™ 21E810 and BYNEL™ 2174. Other anhydride-modified polymers may also be used. Each of the other materials which can be used for adhesive layers 18 and 20 are also commercially available.

In one particular embodiment, the multilayer film of the present invention is directed to a five layered film having the following construction:

1) A first outer exterior layer defining an inner (sealant) layer of a pouch formed from the multilayer film. In one embodiment, the first outer exterior layer comprises a combination of a propylene/ethylene copolymer and a styrene-ethylene-butylene-styrene block copolymer. Generally, the propylene/ethylene copolymer is present in amount from about 70 to 90 weight percent and the styrene-ethylene-butylene-styrene block copolymer is present in an amount that is between about 10 and 30 weight percent, based on the total weight percent of the layer. Preferably, the amount of propylene/ethylene copolymer is between about 75 and 85 weight percent with the amount of styrene-ethylene-butylene-styrene block copolymer being between 15 and 25 weight percent.

2) A first adhesive layer forming the second layer of the film and adhering the first outer exterior layer to an interior core layer; preferably, the first adhesive layer comprises a very low density polyethylene having a density less than about 0.910 g/cc.

3) An interior core layer comprising a polyethylene; preferably, the interior core layer comprises a combination of a metallocene very low density polyethylene having a density less than about 0.910 g/cc and a high density polyethylene having a density greater than about 0.940 g/cc. Generally, the metallocene very low density polyethylene is present in amount from about 80 to 92 weight percent and the high density polyethylene is present in an amount that is between about 8 and 20 weight percent, based on the total weight percent of the layer. In a preferred embodiment, the amount of high density polyethylene is between about 10 and 15 weight percent with the amount of metallocene very low density polyethylene being between 85 and 90 weight percent.

4) A second adhesive layer forming the fourth layer of the film and adhering the interior core layer to a second outer exterior layer. The second adhesive layer preferably comprises an anhydride-modified ethylene/methyl acrylate copolymer having a melt index of about 1 to 4 dg/min and a density of about 0.931 g/cc. And 5) A second outer exterior layer defining an outer surface of a pouch formed from the multilayer film. The second outer exterior layer comprises at least 60% by weight of a copolyester, and from about 5 to 40% by weight of a polyamide 612 component with a melting point of about 215° C. or greater. Preferably, the second outer exterior layer comprises at least 65% of a copolyester and from about 10 to 35 weight percent of the polyamide 612 component.

Multilayer film 10 preferably has a total thickness ranging from about 3 to 14 mils (1 mil=0.001 inch=0.0254 mm), preferably 5 to 10 mils, and most preferably 6.5 to 9.5 mils. Exterior layers 14 and 16 may range in thickness from about 0.5 to about 8 mils, but preferably are about 0.75 mil in thickness. Adhesive layers 18 and 20 may range in thickness from about 0.1 to about 0.75 mil, but preferably are about 0.4 mil in thickness. Interior layer 12 may range in thickness from about 1 to about 9 mils, but preferably is about 5.2 mils in thickness.

As can be appreciated by those having ordinary skill in this art, the multilayer films of the present invention are not limited to the five-layer structure described above. Films having a fewer number of layers than that shown, e.g., the three and four layer structures described earlier herein, are included within the scope of the present invention. In addition, films having a greater number of layers than that shown in FIG. 1 are also included within the scope of the present invention. That is, additional layers could be added to the structure shown in FIG. 1 in order to provide additional desired properties to the film. For example, additional high density polyethylene layer(s) may be included in the film in order to increase the moisture barrier capabilities of the film if such an increase is desired. Additional oxygen barrier layer(s) may also be included if desired.

Various additives may used in any or all of the layers of the multilayer film of the present invention. Such additives include, without limitation, antiblocking agents, antioxidants, processing aids such as calcium stearate, pigments, antistatic agents, etc. Where the multilayer film is to be used to for making medical solution pouches, the amount of additive included in the film is preferably kept to a minimum in order to minimize the likelihood that such additives will be extracted into the medical solution during heat-sterilization.

The inventors of the present invention have also discovered that incorporating a fatty amide or a derivative thereof into one or more layers of the film can help prevent or reduce the formation of foam in the medical solution following autoclaving, although not necessarily with equivalent results.

Fatty amides that can be used in the practice of the invention generally have carbon chains that are between about 12 to 22 carbons, and more typically from about 16 to 18 carbons in length. In particular, it is generally desirable for the fatty amide to have a melting point above about 100° C., and more particularly above about 121° C. Fatty amides that can be used in the invention include primary, secondary, tertiary, or bis(fatty) amides. Examples of the different types include primary fatty amides such as erucamide, behenamide, oleamide, or stearamide; secondary fatty amides such as stearylerucamide, erucylerucamide, oleylpalmitamide, stearylstearamide, or erucylstearamide; tertiary fatty amides such as dimethylstearamide, diethylstearamide; and N,N'-bis(fatty) amides such as N,N'-ethylene bis(stearamide), N,N'-methylene bis(stearamide), N,N'-ethylene bis(oleamide), or N,N'-propylene bis(oleamide). These fatty amides can be used with the present invention singularly or in combination. In addition to fatty amides, derivatives of fatty amides can be used in the practice of the invention including fatty amides having one or more substitutions including N,N' ethylene-bis(12-hydroxysteramide) and N(2-hydroxethyl) 12-hydroxysteramide, and blends thereof.

The amount of the fatty amide component that can be incorporated into the film is generally between about 0.5 to 5 weight percent based on the total weight of the layer to which it has been added, and in particular from about 1 to 2 weight percent. In the case of a layer comprising a copolyester, the amount of fatty amides incorporated into the layer is typically from about 0.5 to 2 weight percent, based on the total weight of the copolyester layer.

The multilayer films of the present invention are preferably formed by cast coextrusion as a tubular film, or as a flat film. Containers for medical applications or other end uses can be made directly from the coextruded, tubular film, or alternatively from rollstock material obtained from the tube after it has been slit and ply-separated. A hot blown process can also be used to make the film, although the optical properties of the resulting pouch would likely be inferior to those from a cast coextrusion process. Other processes, such as extrusion coating, conventional lamination, slot die extrusion, etc., can also be used to make the multilayer film of the present invention, although these alternative processes can be more difficult or less efficient than the preferred method.

Multilayer films in accordance with the present invention can be cross-linked. Cross-linking increases the structural strength of the film at elevated temperatures and/or increases the force at which the material can be stretched before tearing apart. Cross-linking is preferably done by irradiation, i.e., bombarding the film with particulate or non-particulate radiation such as high-energy electrons from an accelerator or cobalt-60 gamma rays, to cross-link the materials of the film. Generally an irradiation dosage level is in the range of from about 2 megarads (MR) to about 8 MR Any conventional cross-linking technique may be used. For example, electronic cross-linking may be carried out by curtain-beam irradiation. Chemical cross-linking techniques may also be employed, e.g., by the use of peroxides.

As will be appreciated in view of the foregoing discussion, the multilayer film is particularly suited for preparing pouches therefrom. The multilayer film can be used to prepare both single and multicompartment pouches. In this regard, FIG. 2 illustrates a pouch that is in accordance with at least one embodiment of the invention and that is broadly designated as reference number 30. As shown, the pouch 30 comprises a container having an interior space 32 for containing a medical solution 34 therein. In one embodiment, the pouch 30 may comprise a front sheet 36 and a rear sheet 38 of multilayer film 10 that are oriented face-to-face and affixed to each other at side edges 40, 42, top edge 44, and bottom edge 46. In one embodiment, the pouch is formed of a multilayer film in which the exterior layer forming the outer surface 48 of the pouch comprises a copolyester having a dicarboxylic acid component and a diol component, and a fatty amide or fatty amide derivative component. Preferably, the fatty amide component is present in an amount from about 1 to 2 weight percent based on the total weight percent of the outer layer of the multilayer film.

Generally, each of the edges is a heat seal having a seal strength of about 40 N/in or greater as measured by ASTM test F88. In some embodiments, the front and rear sheets may comprise two separate sheets, or alternatively, a single sheet of multilayer film 10 that has been center-folded at bottom edge 46. Together the sheets define pouch 30 having an interior compartment 32 for receiving a solution therein. The front and rear sheets may be sealed together using thermal bonds, ultrasonic bonds, radio frequency sealing, or the like. As used herein, the term "seal strength" refers to the force per unit width of film required to progressively separate two materials that have been sealed together.

In some embodiments, the pouch may comprise a discharge outlet 60 that is adapted to be in fluid communication with compartment 32. The discharge outlet may be attachable to a standard IV device and/or administration set. The pouch may also comprise a support hole 70 or clip for attaching the pouch to a support such as stand. In one embodiment, the pouch may comprise one or more inlets for introducing components that are to be confined within the pouch. In some embodiments, discharge outlet 60 may serve a dual role for introducing the components and releasing the components at a desired time.

In one embodiment, the pouch 30 comprises a container or pouch having a bag-like shape. Alternatively, the pouch 30 may have a bottle-like, tray-like, box-like, or tube-like shape. The shape and size of the pouch may be varied depending upon its intended use and need.

The pouch may be prepared in a variety of ways. In one embodiment, the pouch may be prepared from a roll of double-wound multilayer film 10 wherein the sheets are separated to form the front and rear sheets of the pouch. The separate sheets may then be conveyed in a substantially parallel manner. In other embodiments, the front and rear sheets may be formed from a tubular film or from sheets of film that are provided on separate supply rolls. In some embodiments, any excess sheet material can be trimmed away from around the perimeter heat seals. If desired, the front or rear sheets may be printed with any necessary labeling information.

After the pouch has been manufactured, sealed, and filled, it is ready for sterilization. Autoclaving is a method that is commonly used for sterilizing medical liquids and equipment. In one technique, the sterilized pouch is placed into a plastic overwrap or container. The overwrap may serve as a dust cover and help protect the contents of the pouch from any external foreign contaminants, moisture loss, gas permeation, etc. If desired, the sterilization process could be performed following the overwrapping process. Additionally, depending upon the product requirements, one compartment can be filled and sterilized first, followed by the filling, sealing, and sterilization of the other compartment.

Pouches made by the multilayer films of the present invention may be sealed by various means well known in the art, including impulse and hot-bar sealing. An example of a commercially available impulse-type sealing device is a Vertrod™ heat sealer. The heat-seals which form the top and bottom of the pouch (generally shorter in length than the sides of the pouch) are preferably formed in the machine direction of the multilayer film (i.e., the direction in which the film moved through the production equipment), verses the transverse direction (which is perpendicular to the machine direction).

The multilayer films of the present invention have been described in connection with a pouch for the packaging of medical solutions. However, it is to be understood that other applications for the films are also possible, and that this disclosure should not be construed as being limited only to medical solution pouches.

The invention may be further understood by reference to the following examples, which are provided for the purpose of representation, and are not to be construed as limiting the scope of the invention.

EXAMPLES

All of the films used in the examples were cast coextruded and cross-linked by high-energy electron radiation. Each of the films had the five-layer structure shown in FIG. 1 and had a total thickness of approximately 7.5 mils. The exterior layers 14 and 16 each had a thickness of about 0.55 mils and 0.75 mils, respectively, adhesive layers 18 and 20 each had a thickness of about 0.4 mils, and interior layer 12 had a thickness of approximately 5.4 mils.

The materials used in the examples are identified below. All percentages are weight percents unless indicated otherwise. All physical property and compositional values are approximate unless indicated otherwise.

"EPC-1": Z9450™; a propylene/ethylene copolymer having an ethylene content of about 6 weight percent and a density of about 0.89 g/cc (ASTM D-1505); obtained from the TOTAL Petrochemicals.

"SEBS": Kraton G-1652™; a styrene-ethylene-butylene-styrene block copolymer having a tensile strength of about 4500 psi (ASTM D-412), a 300% modulus of about 700 psi (ASTM D-412), an elongation of about 500% (ASTM D-412), a Shore A hardness of about 75, and a specific gravity of about 0.91; obtained from Kraton Polymers Co.

"HDPE": Fortiflex T60-500-119; a high density polyethylene obtained from Ineos Olefins and Polymers.

"VLDPE": Engage EG 8100G™ a metallocene very low density polyethylene obtained from The Dow Chemical Company, Midland, Mich.

"mVLDPE": Exceed 1012CA™; a very low density metallocene polyethylene obtained from ExxonMobil, Irving, Tex.

"EMA": BYNEL 21E810™; an anhydride-modified ethylene/methyl acrylate copolymer having a melt index of about 2.8 dg/min (ASTM D-1238) and a density of about 0.931 g/cc (ASTM-1505); obtained from E. I. DuPont de Nemours of Wilmington, Del.

"CPE": ECDEL 9965™; a copolyester ether having a flow rate of about 20 grams/10 minutes (ASTM D-1238) and a specific gravity of about 1.13 (ASTM D-792); obtained from Eastman Chemical Products, Inc., Kingsport, Tenn.

"AO": Irganox 1010™; an antioxidant and thermal stabilizer obtained from the Ciba Specialty Chemicals.

"PA 612": is polyamide 612 having a melting point of 215° C. obtained from EMS Grivory under the tradename XE 3912.

"Calcium Stearate": Calcium Stearate obtained from Mineral and Pigment Solutions, Inc., "FA"; N,N' ethylene-bis(12-hydroxysteramide), a fatty amide having a melting point of 140° C. obtained from Vertellus under the tradename Paricin 285®.

Examples 1-10

A multilayer film in accordance with the present invention had the following five-layer structure:

First exterior (heat-seal) layer 14: 80% EPC-1+20% SEBS
First adhesive layer 18: VLDPE
Interior (core) layer 12: 88% mVLDPE+12% HDPE
Second adhesive layer 20: EMA
Second exterior (abuse-resistant) layer 16: included CPE and an anti-foaming additive as set forth in Table 1 below. The weight percent of the anti-foaming agent is based on the total weight of the second exterior layer.

The effects of the anti-foaming agent on bubble formation using various anti-foaming additives are summarized in Table 1 below. The films have the same structure with the exception of the addition of the anti-foaming additive in the second exterior layer of the film. The comparative Example did not include an anti-foaming additive.

TABLE 1

Bubble Test Results

|  | Weight % CPE | Weight % PA 612 | Weight % Ca Stearate | Weight % FA | Bubble Test | Haze % | Blooming |
| --- | --- | --- | --- | --- | --- | --- | --- |
| Example 1 | 90 | 10 | — | — | Passed | 4.75 | Not observed |
| Example 2 | 85 | 15 | — | — | Passed | 5.84 | Not observed |
| Example 3 | 80 | 20 | — | — | Passed | 6.68 | Not observed |
| Example 4 | 65 | 35 | — | — | Passed | 6.76 | Not observed |
| Example 5* | 98.85 | — | 1 | — | Passed |  | Not observed |
| Example 6* | 97.7 | — | 2 | — | Passed | 8.6 | Not observed |
| Example 7 | 98 | — | — | 2 | Passed | — | Observed |
| Comparative Example | 100 | 0 | 0 | 0 | Failed | 6.27 | — |

*Examples 5 and 6 include 0.15% and 0.3% of euramid wax as an antiblock agent, respectively.

Test solutions prepared from the multilayer films of Examples 1-7 and Comparative Example were prepared in accordance with the State Drug Package Container Material Standard No. YBB00112005. A 5 ml sample of each test solution was placed in a test tube and then subjected to vigorous shaking for 3 minutes. After shaking, little to no foam was present in the test tubes. At the end of the 3 minutes, the test tubes were placed in a test tube stand and observed for 3 minutes. At the end of 3 minutes there is to be no foam present. As can be seen in the above table, the films of Examples 1-7 all passed the bubble test. Blooming was observed in Example 7. The Comparative Example film failed the bubble test.

With the test solution prepared from the film of Example 1, the foam disappeared almost immediately after shaking was stopped. In contrast, the test solution prepared from the reference film showed a distinct appearance of foam after shaking. Typically if foam occurs as in the reference film, the foam will be present immediately after the shaking is ceased. As the test solution comes to rest, the foam from the reference film is very noticeable and is present on the surface of the test solution. The foam height in the reference film test solution has been observed to be up to 12 mm. The test solution prepared from the film of Example 1, had minimal or no foam present after shaking. Any foam that was present after shaking disappeared quickly within the 3 minutes.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for reducing or preventing the formation of bubbles in a medical solution contained in a pouch after heat sterilization, the method comprising:

cast extruding a flexible multilayer film having an outer layer comprising a copolyester having a dicarboxylic acid component and a diol component;

incorporating a polyamide 612 into said copolyester layer, wherein polyamide 612 is present in an amount from about 15 to 35 weight percent based on the weight of the copolyester layer;

forming the flexible multilayer film into a pouch having an interior space for receiving a medical solution therein by orienting front and rear sheets comprising said flexible multilayer film in a face-to-face relationship and heat sealing said front and rear sheets to each other along opposing adjacent edges to define said interior space, wherein upon packaging a medical solution therein, the pouch is capable of passing the bubble test as set forth in the Chinese State Drug Package Container Material Standard No. YBB00112005, and wherein the multilayer film further comprises a core layer comprising a combination of a metallocene very low density polyethylene having a density less than 0.910 g/cc and a high density polyethylene having a density greater than 0.940 g/cc;

a second outer layer comprising a combination of a propylene/ethylene copolymer and a styrene-ethylene-butylene-styrene block copolymer; and first and second adhesive layers joining each of the outer layers to the core layer.

2. The method of claim 1, wherein the polyamide 612 is incorporated in to the copolyester layer during the step of extruding the film.

3. The method of claim 1, further including the step of introducing a medical solution into the pouch through an opening therein and sealing said opening closed.

4. The method of claim 1, wherein polyamide 612 is present in an amount from about 20 to 30 weight percent based on the weight of the copolyester layer.

5. The method of claim 1, wherein polyamide 612 is present in an amount from about 20 to 35 weight percent based on the weight of the copolyester layer.

6. A method for reducing or preventing the formation of bubbles in a medical solution contained in a pouch after heat sterilization, the method comprising:

cast extruding a flexible multilayer film having an outer layer comprising a copolyester having a dicarboxylic acid component and a diol component;

incorporating a polyamide 612 into said copolyester layer, wherein polyamide 612 is present in an amount from about 15 to 35 weight percent based on the weight of the copolyester layer;

forming the flexible multilayer film into a pouch having an interior space for receiving a medical solution therein by orienting front and rear sheets comprising said flexible multilayer film in a face-to-face relationship and heat sealing said front and rear sheets to each other along opposing adjacent edges to define said interior space, wherein upon packaging a medical solution therein, the pouch is capable of passing the bubble test as set forth in the Chinese State Drug Package Container Material Standard No. YBB00112005, wherein the multilayer film comprises a first outer layer comprised of the copolyester and polyamide 612 wherein the polyamide 612 is present in an amount from about 15 to 35 weight percent based on the total weight percent of the first outer layer;

a core layer comprising a very low density polyethylene;

a second outer layer of a heat sealable material; and a first and second adhesive layers joining the first and second outer layers to the core layer, respectively, and wherein the second outer layer comprises a combination of a propylene/ethylene copolymer and a styrene-ethylene-butylene-styrene block copolymer.

7. The method of claim 6, wherein the propylene/ethylene copolymer is present in amount from about 70 to 90 weight percent and the styrene-ethylene-butylene-styrene block copolymer is present in an amount that is between about 10 and 30 weight percent, based on the total weight percent of the second outer layer.

8. The method of claim 6, wherein the first adhesive layer comprises a very low density polyethylene having a density less than 0.910 g/cc.

9. A method for reducing or preventing the formation of bubbles in a medical solution contained in a pouch after heat sterilization, the method comprising:

cast extruding a flexible multilayer film having an outer layer comprising a copolyester having a dicarboxylic acid component and a diol component;

incorporating a polyamide 612 into said copolyester layer, wherein polyamide 612 is present in an amount from about 15 to 35 weight percent based on the weight of the copolyester layer;

forming the flexible multilayer film into a pouch having an interior space for receiving a medical solution therein by orienting front and rear sheets comprising said flexible multilayer film in a face-to-face relationship and heat sealing said front and rear sheets to each other along opposing adjacent edges to define said interior space, wherein upon packaging a medical solution therein, the pouch is capable of passing the bubble test as set forth in the Chinese State Drug Package Container Material Standard No. YBB00112005, and wherein the multilayer film further comprises a core layer comprising a very low density polyethylene that is present in amount from about 80 to 92 weight percent and the high density polyethylene is present in an amount that is between about 8 and 20 weight percent, based on the total weight percent of the core layer;

a second outer layer of a heat sealable material; and a first and second adhesive layers joining the first and second outer layers to the core layer, respectively.

* * * * *